United States Patent
Varela

(10) Patent No.: US 8,251,861 B2
(45) Date of Patent: Aug. 28, 2012

(54) PLANETARY WHEEL END WITH PILOTED SUN GEAR SHAFT

(75) Inventor: Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 493 days.

(21) Appl. No.: 12/500,633

(22) Filed: Jul. 10, 2009

(65) Prior Publication Data

US 2011/0009222 A1 Jan. 13, 2011

(51) Int. Cl.
*F16H 57/08* (2006.01)
*F16H 3/44* (2006.01)
*B60K 17/04* (2006.01)

(52) U.S. Cl. .......................... 475/331; 180/372; 475/311

(58) Field of Classification Search .................. 475/331, 475/346, 311, 323, 314–316, 326–328; 180/372
See application file for complete search history.

(56) References Cited

U.S. PATENT DOCUMENTS

| | | | |
|---|---|---|---|
| 3,055,236 A | 9/1962 | Born, Jr. | |
| 4,037,694 A * | 7/1977 | Keese | 192/221.1 |
| 4,095,675 A | 6/1978 | Bell | |
| 4,158,971 A * | 6/1979 | Szalai et al. | 475/343 |
| 4,207,780 A | 6/1980 | Saxton | |
| 4,334,590 A * | 6/1982 | Plumb | 180/247 |
| 4,424,879 A | 1/1984 | Sonozgni | |
| 4,489,626 A | 12/1984 | Lemon | |
| 5,435,793 A | 7/1995 | Varela et al. | |
| 6,672,985 B2 | 1/2004 | Chung et al. | |
| 6,676,228 B1 | 1/2004 | Varela et al. | |
| 6,695,738 B2 | 2/2004 | Sullivan et al. | |
| 6,869,380 B2 * | 3/2005 | Oberstarr | 475/323 |
| 6,886,655 B2 | 5/2005 | Varela et al. | |
| 7,204,339 B2 | 4/2007 | Varela et al. | |
| 7,314,105 B2 | 1/2008 | Varela et al. | |
| 7,350,606 B2 | 4/2008 | Brill et al. | |
| 2004/0254044 A1* | 12/2004 | Oberstarr | 475/323 |
| 2007/0219043 A1* | 9/2007 | Moon | 475/311 |
| 2008/0236908 A1 | 10/2008 | Cooper et al. | |

FOREIGN PATENT DOCUMENTS

| | | |
|---|---|---|
| JP | 3153447 | 7/1991 |
| WO | 0021771 | 4/2000 |

OTHER PUBLICATIONS

European Search Report Dated November 9, 2010.

\* cited by examiner

*Primary Examiner* — Roger Pang
(74) *Attorney, Agent, or Firm* — Carlson, Gaskey & Olds, PC

(57) ABSTRACT

A planetary wheel end assembly includes an axle shaft having an inboard end and an outboard end, a planetary gear assembly receiving driving input from the axle shaft, and a rotational support element that pilots the outboard end of the axle shaft. The planetary gear assembly includes a sun gear that is fixed for rotation with the axle shaft, a plurality of planet gears that are in meshing engagement with the sun gear, a non-rotating ring gear that is in meshing engagement with the planet gears, and a planetary spider that supports the plurality of planet gears. The planetary spider provides driving output to rotate a wheel component. The rotational support element is positioned radially between the outboard end of the axle shaft and planetary spider to allow relative rotation between the planetary spider and the outboard end of the axle shaft.

22 Claims, 1 Drawing Sheet

PLANETARY WHEEL END WITH PILOTED SUN GEAR SHAFT

TECHNICAL FIELD

The subject invention relates to a planetary wheel end that includes an axle shaft and planetary gear assembly with a rotational support element that pilots the axle shaft relative to a planetary spider.

BACKGROUND OF THE INVENTION

Planetary wheel end assemblies include a planetary gear assembly that receives driving input from an axle shaft. A typical planetary gear assembly includes a sun gear that is fixed for rotation with the axle shaft, a plurality of planet gears, a ring gear, and a planetary spider that supports the planet gears. In one known configuration, the ring gear is fixed to a non-rotating component, such as a housing for example, and the planetary spider provides driving output for a wheel component.

In certain applications the planetary wheel end assembly also includes a wet disc brake. The wet disc brake includes stationary discs fixed to the housing and rotating discs that are fixed for rotation with the axle shaft. Due to the high speed at which the rotating discs rotate, any out of center condition can generate high centrifugal forces that can cause the sun gear to become mis-aligned. This can result in noise, vibration, and reduced wear life for the gears. Solutions have been proposed to address this out of center condition but these solutions have been proven to be expensive and ineffective.

SUMMARY OF THE INVENTION

A planetary wheel end assembly includes an axle shaft having an inboard end and an outboard end, a planetary gear assembly that receives driving input from the axle shaft, and a rotational support element that pilots the outboard end of the axle shaft.

In one example, the planetary wheel end assembly includes a wet disc brake. The wet disc brake includes at least one rotating disc fixed for rotation with the axle shaft and at least one non-rotating disc fixed to a non-rotating structure, such as a housing for example. In one example configuration, the wet disc brake is positioned inboard of the planetary gear assembly.

In one example, the planetary gear assembly includes a sun gear that is fixed for rotation with the axle shaft, a plurality of planet gears that are in meshing engagement with the sun gear, a non-rotating ring gear that is in meshing engagement with the planet gears, and a planetary spider that supports the plurality of planet gears. The planetary spider provides driving output to rotate a wheel component. The rotational support element is positioned radially between the outboard end of the axle shaft and planetary spider to allow relative rotation between the planetary spider and the outboard end of the axle shaft.

In one example, the rotational support element comprises one of a bushing or a bearing. The rotational support element is positioned within a bore formed within an inboard end face of the planetary spider. The rotational support element is positioned directly between an outer surface of the axle shaft and a surface that defines the bore.

Piloting the axle shaft to the planetary spider assures that sun gear runout is more precisely controlled and also better centers the discs of the brake to reduce the affects of centrifugal forces and vibrations.

These and other features of the present invention can be best understood from the following specification and drawings, the following of which is a brief description.

DETAILED DESCRIPTION OF THE PREFERRED EMBODIMENT

Figure 1:
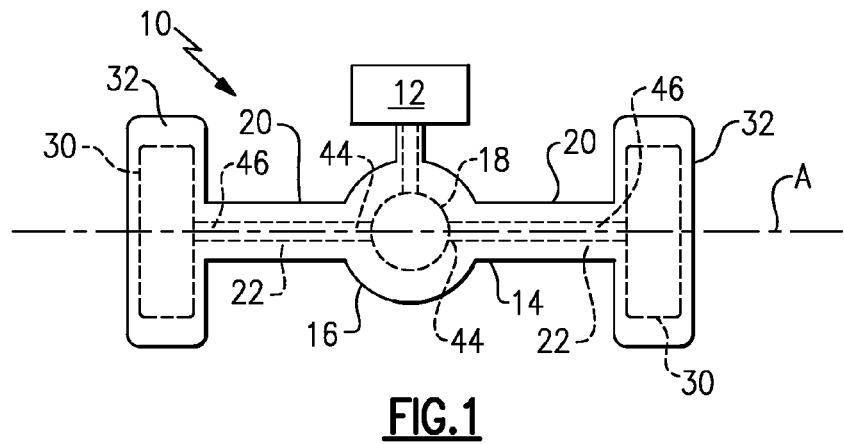
FIG. 1 is a schematic view of a drive axle with planetary wheel end assemblies.

A drive axle 10 includes receives driving input from a power source 12, such as an engine or electric motor, for example. The drive axle 10 includes an axle housing 14 that includes a carrier portion 16 that encloses a gear assembly 18 and leg portions 20 that enclose axle shafts 22. The gear assembly 18 receives the driving input from the power source 12 and provides driving output to the axle shafts 22. The gear assembly 18 typically includes a differential that receives input from an input gear assembly that includes a ring and pinion.

Figure 2:
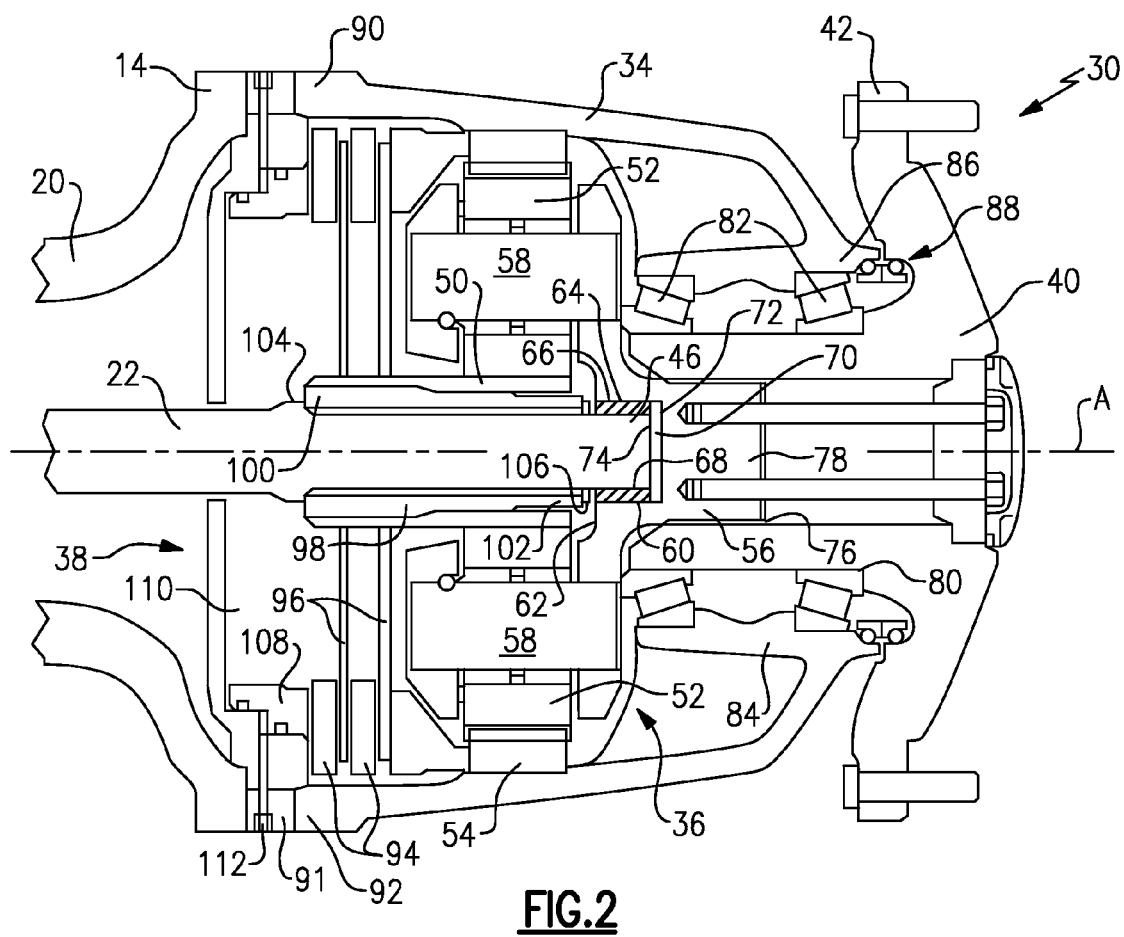
FIG. 2 is a cross-sectional view of one of the planetary wheel end assemblies of FIG. 1 incorporating the subject invention.

The axle shafts 22 drive planetary wheel end assemblies, schematically shown at 30 in FIG. 1, which in turn drive laterally spaced apart wheels 32 about an axis of rotation A. An example of the planetary wheel end assembly 30 is shown in FIG. 2. The planetary wheel end assembly 30 includes a housing 34 that is mounted to the leg portion 20 of the axle housing 14. The housing 34 encloses a planetary gear assembly 36 and a wet disc brake 38. The planetary gear assembly 36 receives driving input from the axle shaft 22 and provides driving output to an output shaft 40. The output shaft 40 includes a wheel mount flange 42 that provides a mounting interface for the wheel 32.

The axle shaft 22 includes an inboard end 44 that is coupled to the gear assembly 18 (FIG. 1) and an outboard end 46 that drives the planetary gear assembly 36. The planetary gear assembly 36 includes a sun gear 50 that is fixed for rotation with the axle shaft 22 near the outboard end 46, a plurality of planet gears 52 that are in meshing engagement with the sun gear 50, a non-rotating ring gear 54 that is in meshing engagement with the planet gears 52, and a planetary spider 56 that supports the planet gears 52. The planet gears 52 are supported on planet pins 58 that are fixed to the planetary spider 56. The ring gear 54 is fixed to the housing 34. The sun gear 50 drives the planet gears 52 against the ring gear 54 to provide driving output via the planetary spider 56.

The planetary spider 56 includes a bore 60 that is formed within an inboard end face 62 of the planetary spider 56. The bore 60 receives a rotational support element 64 that pilots the outboard end 46 of the axle shaft 22 within the planetary spider 56. The rotational support element 64 comprises a bushing or bearing that defines an outer surface 66 that abuts directly against a surface defining the bore 60 and an inner surface 68 that abuts directly against an outer surface of the axle shaft 22. By using the rotational support element 64 to pilot the axle shaft 22, sun gear runout is more precisely controlled than what would be provided by backlash and runout of the planetary gears alone.

A thrust element 70 is positioned between an end face 72 of the bore 60 and a shaft end face 74 of the axle shaft 22. The thrust element 70 can comprise a spacer or washer for example.

The output shaft 40 is driven by the planetary spider 56. The output shaft 40 includes a bore 76 that receives an outboard end 78 of the planetary spider 56. An outer surface 80 of the output shaft 40 supports a set of wheel bearings 82. The wheel bearings 82 are seated in a bearing cage portion 84 of the housing 34. The wheel bearings 82 are positioned outboard of the planetary gear assembly 36 and are positioned directly between the bearing cage portion 84 and the outer surface 80 of the output shaft. The wheel bearings 82 rotatably support the output shaft 40 for rotation relative to the housing 34.

The wheel mount flange 42 extends outwardly from an outboard end portion 86 of the housing 34. Seals 88 are provided at an interface between the output shaft 40 and the outboard end portion 86 of the housing 34.

The wet disc brake 38 is enclosed within an inboard end portion 90 of the housing 34. The wet disc brake 38 includes an actuator housing 91, a brake housing 92, a plurality of stationary discs 94 that are fixed to the brake housing 92, and a plurality of rotating discs 96 that are fixed for rotation with the axle shaft 22. In the example shown, the rotating discs 96 are fixed to a shaft sleeve 98 that is fixed for rotation with the axle shaft 22; however the discs 96 could also be fixed directly to the axle shaft 22.

The shaft sleeve 98 includes an inboard end 100 and an outboard end 102. The sun gear 50 is fixed to the outboard end 102 of the shaft sleeve 98. The sun gear 50 and shaft sleeve 98 can be integrally formed together as a single piece component, or could be separate components that are fixed to each other. The outboard end 46 of the axle shaft 22 extends outboard of the outboard end 102 of the shaft sleeve 98. The rotational support element 64 is mounted on this exposed portion of the axle shaft 22. Thus, the rotational support element 64 and the shaft sleeve 98 are axially spaced apart from each other in a direction extending along the axis of rotation A.

The axle shaft 22 includes a first a first stop 104 to engage an inboard end face of the shaft sleeve 98 and a second stop 106 to engage an outboard end face of the shaft sleeve 98 to prevent relative axial movement between the shaft sleeve 98 and said axle shaft 22. In one example, the first stop 104 comprises an enlarged shoulder portion formed about an outer circumference of the axle shaft and the second stop 106 comprises a snap ring or other type of retaining element.

The wet disc brake 38 also includes a piston 108 that is positioned within the actuator housing 91. The brake housing 92 provides a sealed cavity 110 for the wet disc brake 38. A port 112 extending through the actuator housing 91 delivers fluid to actuate movement of the piston 108 as known. Actuation of the piston 108 produces a uniform compressive axial force between the stationary discs 94 and the rotating discs 96, which in turn brakes the axle shaft 22. This brake torque is then transmitted to the wheel mount flange 42 in an amplified manner through the planetary gear assembly 36.

In the example shown in FIG. 2, the brake housing 92 is positioned between the axle housing 14 and the housing 34 of the planetary wheel end assembly 30. A single set of fasteners (not shown) can be used to secure these three housing portions together. Optionally, the brake housing could be formed as part of the axle housing 14 and/or the housing 34.

As discussed above, piloting the axle shaft 22 to the planetary spider 56 assures that sun gear runout is more precisely controlled. Another advantage with the planetary wheel end assembly 30 is that the rotating brake discs 96 are better centered to reduce the affects of centrifugal forces and vibrations. This reduces noise and improves fatigue life of the gear components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A planetary wheel end assembly comprising:
   an axle shaft defining an axis of rotation, said axle shaft having an inboard end and an outboard end, wherein the inboard end is configured to be coupled to a differential gear assembly that receives driving input;
   a planetary gear assembly including a sun gear driven by said axle shaft, a plurality of planet gears in meshing engagement with said sun gear, a non-rotating ring gear in meshing engagement with said plurality of planet gears, and a planetary spider supporting said planet gears, said planetary spider providing a driving output to rotate a wheel component;
   an output shaft driven by said planetary spider, said output shaft including a bore that receives an outboard end of said planetary spider;
   first and second wheel bearings that support said output shaft for rotation relative to a housing, said outboard end of said planetary spider being positioned axially between said first and second bearings; and
   a rotational support element positioned radially between said outboard end of said axle shaft and said planetary spider to allow relative rotation between said planetary spider and said outboard end of said axle shaft.

2. The planetary wheel end assembly according to claim 1 wherein said rotational support element comprises one of a bearing or a bushing.

3. The planetary wheel end assembly according to claim 2 wherein said planetary spider includes a bore that receives said outboard end of said axle shaft, and wherein said rotational support element is positioned within said bore at a location that is radially between an outer surface said axle shaft and an inner surface of said bore.

4. The planetary wheel end assembly according to claim 3 wherein an outer surface of said rotational support element directly engages said inner surface of said bore and wherein an inner surface of said rotational support element directly engages said outer surface of said axle shaft.

5. The planetary wheel end assembly according to claim 2 including a shaft sleeve surrounding said axle shaft, said shaft sleeve having an inboard sleeve end and an outboard sleeve end with said outboard end of said axle shaft extending outboard of said outboard sleeve end of said shaft sleeve, and wherein said shaft sleeve is fixed for rotation with said axle shaft about said axis of rotation and wherein said sun gear is fixed for rotation with said shaft sleeve.

6. The planetary wheel end assembly according to claim 5 wherein said sun gear and said shaft sleeve are integrally formed together as a single-piece component.

7. The planetary wheel end assembly according to claim 5 wherein said outboard end of said axle shaft extends outwardly of said shaft sleeve and into a bore formed in an inboard end face of said planetary spider.

8. The planetary wheel end assembly according to claim 7 wherein said axle shaft includes a first stop to engage an inboard end face of said shaft sleeve and a second stop to engage an outboard end face of said shaft sleeve to prevent relative axial movement between said shaft sleeve and said axle shaft.

9. The planetary wheel end assembly according to claim 1 wherein said first and second wheel bearings are positioned substantially outboard of said ring gear.

10. The planetary wheel end assembly according to claim 1 wherein said inboard end of said axle shaft is directly coupled to said differential assembly which is configured to receive the driving input from an input gear assembly, and wherein said outboard end of said axle shaft is directly received within a bore formed within said planetary spider.

11. The planetary wheel end assembly according to claim 10 wherein said rotational support element comprises an outer peripheral surface that directly engages a surface defining said bore and comprises an inner peripheral surface that directly engages an outer surface of said axle shaft.

12. The planetary wheel end assembly according to claim 10 including a shaft sleeve surrounding said axle shaft, said shaft sleeve having an inboard sleeve end and an outboard sleeve end with said outboard end of said axle shaft extending outboard of said outboard sleeve end and into said bore.

13. The planetary wheel end assembly according to claim 12 wherein said sun gear is associated with said outboard sleeve end.

14. The planetary wheel end assembly according to claim 1 wherein an outer surface of said outboard end of said axle shaft is in direct engagement with an inner surface of said rotational support element.

15. The planetary wheel end assembly according to claim 14 wherein said outboard end of said axle shaft extends axially through said sun gear and is received within a bore formed within said planetary spider.

16. A planetary wheel end assembly comprising:
   an axle shaft defining an axis of rotation, said axle shaft having an inboard end and an outboard end;
   a planetary gear assembly including a sun gear driven by said axle shaft, a plurality of planet gears in meshing engagement with said sun gear, a non-rotating ring gear in meshing engagement with said plurality of planet gears, and a planetary spider supporting said planet gears, said planetary spider providing a driving output to rotate a wheel component;
   a rotational support element comprising one of a bearing or a bushing, said rotational support element positioned radially between said outboard end of said axle shaft and said planetary spider to allow relative rotation between said planetary spider and said outboard end of said axle shaft;
   a shaft sleeve surrounding said axle shaft, said shaft sleeve having an inboard sleeve end and an outboard sleeve end with said outboard end of said axle shaft extending outboard of said outboard sleeve end of said shaft sleeve, and wherein said shaft sleeve is fixed for rotation with said axle shaft about said axis of rotation and wherein said sun gear is fixed for rotation with said shaft sleeve;
   wherein said outboard end of said axle shaft extends outwardly of said shaft sleeve and into a bore formed in an inboard end face of said planetary spider;
   wherein said axle shaft includes a first stop to engage an inboard end face of said shaft sleeve and a second stop to engage an outboard end face of said shaft sleeve to prevent relative axial movement between said shaft sleeve and said axle shaft; and
   wherein said first stop comprises an enlarged shoulder portion formed about an outer circumference of said axle shaft.

17. The planetary wheel end assembly according to claim 8 wherein said second stop comprises a snap ring.

18. The planetary wheel end assembly according to claim 5 wherein said shaft sleeve and said rotational support element are axially spaced apart from each other in a direction extending along said axis of rotation.

19. The planetary wheel end assembly according to claim 2 including a brake with at least one rotating brake element, at least one non-rotating brake element, and an actuator that exerts an axial force to move said at least one rotating brake element and said at least one non-rotating brake element into engagement with each other.

20. The planetary wheel end assembly according to claim 19 wherein said brake comprises a wet disc brake with said at least one rotating brake element comprising at least one rotating disc fixed for rotation with said axle shaft, said at least one non-rotating brake element comprising at least one stationary disc fixed to a housing, and said actuator comprising a piston.

21. The planetary wheel end assembly according to claim 20 wherein said housing encloses said wet disc brake and said planetary gear assembly.

22. The planetary wheel end assembly according to claim 21 wherein said wet disc brake is positioned axially inward of said planetary gear assembly.

* * * * *